J. A. ROUMIMPER.
COMPRESSED AIR WATER ELEVATOR.
APPLICATION FILED AUG. 21, 1922.

1,438,863.

Patented Dec. 12, 1922.
3 SHEETS—SHEET 1.

Inventor
J. A. Roumimper
By Marks & Clerk
Attys.

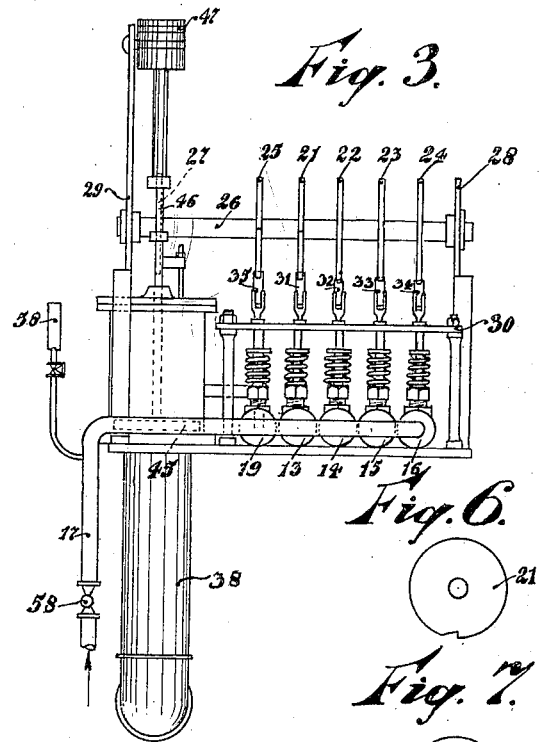

J. A. ROUMIMPER.
COMPRESSED AIR WATER ELEVATOR.
APPLICATION FILED AUG. 21, 1922.

1,438,863.

Patented Dec. 12, 1922.
3 SHEETS—SHEET 3.

Inventor
J. H. Roumimper
By Marks & Clerk
Attys.

Patented Dec. 12, 1922.

1,438,863

UNITED STATES PATENT OFFICE.

JACOBUS ALEXANDER ROUMIMPER, OF TJILATJAP, JAVA, DUTCH EAST INDIES, ASSIGNOR OF ONE-HALF TO LUCAS OOSTING BENTUM, OF TASIKMALAJA, JAVA, DUTCH EAST INDIES.

COMPRESSED-AIR WATER ELEVATOR.

Application filed August 21, 1922. Serial No. 583,411.

*To all whom it may concern:*

Be it known that I, JACOBUS ALEXANDER ROUMIMPER, a subject of the Queen of the Netherlands, and residing at Tjilatjap, Java, Dutch East Indies, have invented certain new and useful Improvements in a Compressed-Air Water Elevator, of which the following is a specification.

The present device relates to a distributing and regulating device for the supply of compressed air to liquid containers, for instance oil wells, each of which is provided with a liquid lifting device provided with a supply conduit for air under pressure and a discharge conduit for liquid, such as oil.

Hitherto with known devices of this kind each oil well required the attendance of a man, charged with the regulation of the oil production day and night.

According to the invention, this disadvantage is eliminated by a central automatically operating distributing apparatus, requiring no attendance. This apparatus is preferably placed centrally of a plurality of the liquid containers or oil wells, the regulation of the production being effected by air under pressure. Hitherto it was the duty of the attending person to open and close the valves, and this required constant attention. As such work is very tiresome, the operator often neglected the same and, therefore, a satisfactory and continuous working was not at all guaranteed, and the production could not be increased to its utmost.

The invention will be described more fully hereinafter with reference to the accompanying drawings, illustrating a device according to the invention by way of example.

Figure 1:
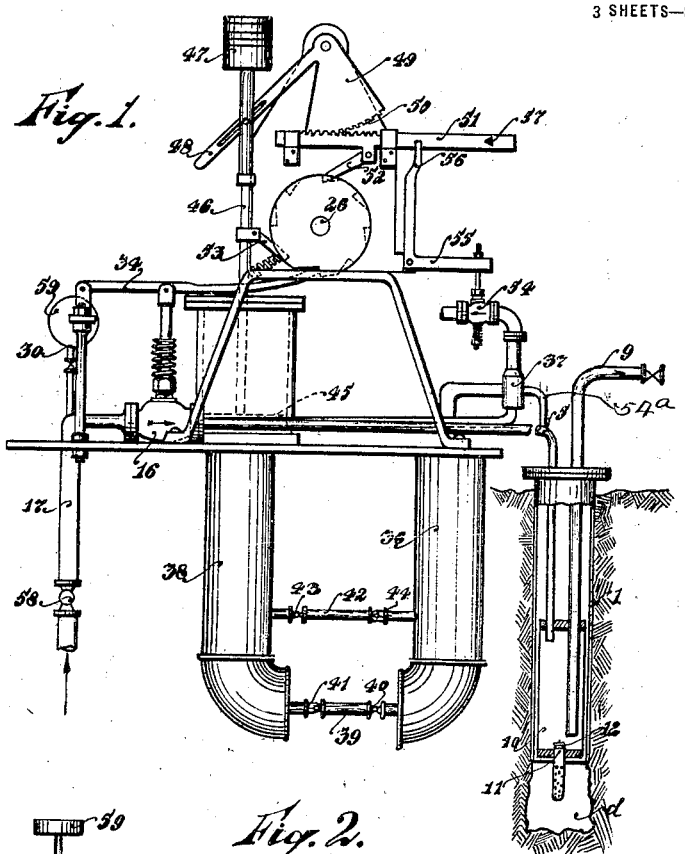
Figure 2:
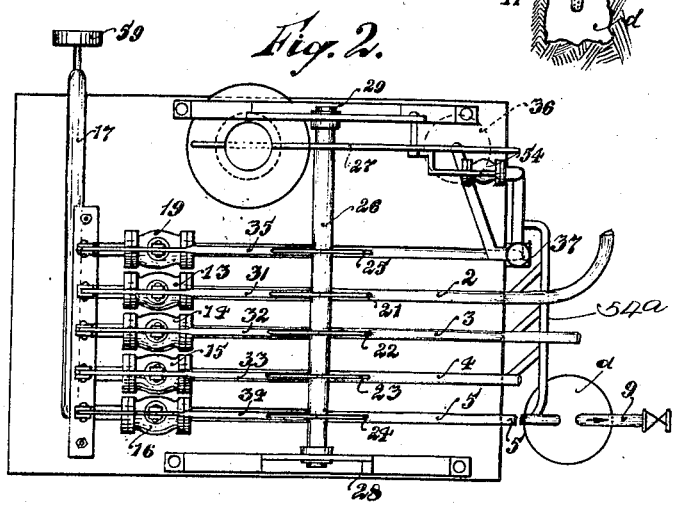

Fig. 1 is a front elevation, partially in section,

Fig. 2 a plan view, and

Fig. 3 a side elevation of an automatic distributing and regulating device according to the invention.

Figures 4 to 9 inclusive are side views of valve controlled disks forming part of the apparatus.

Figure 10:
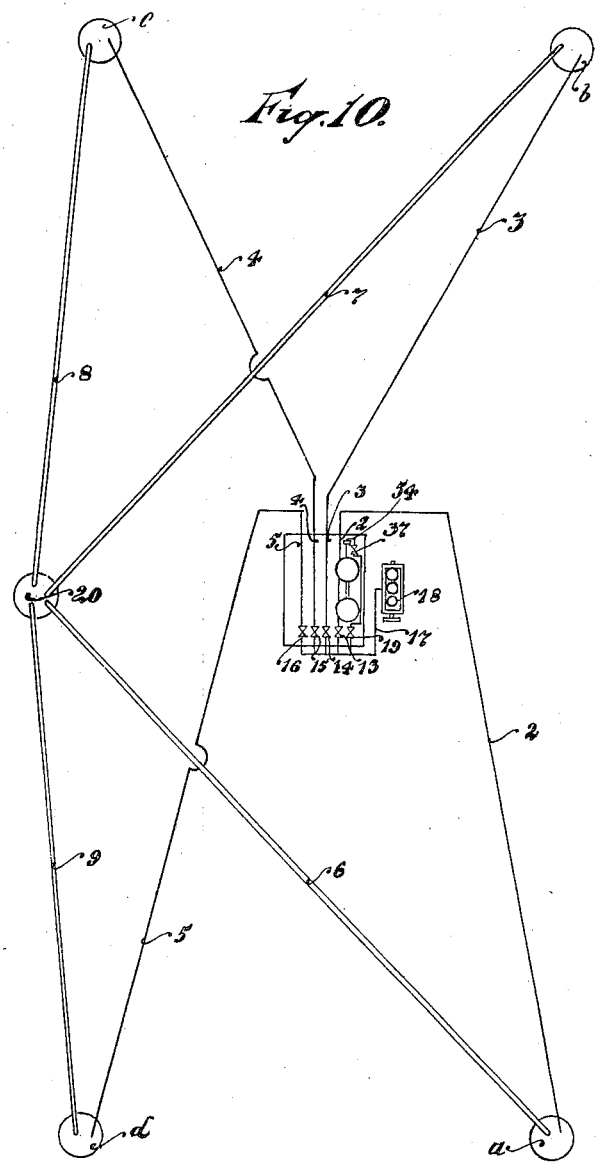

Figure 10 is a diagrammatic view of the apparatus shown connected to four wells.

In each of the wells $a$, $b$, $c$, $d$, (Fig. 10) is arranged a cylinder 1 (Fig. 1), into which projects a compressed air supply pipe 2, 3, 4, and 5 respectively and an oil discharge pipe 6, 7, 8, and 9 respectively. Both pipes open into an inner cylinder 10, placed in the cylinder or closed tank 1 and having a bottom provided with an opening 11 and an inlet check valve 12, permitting oil to flow into the cylinder 10. The supply of air under pressure to the wells and the air pipes 2, 3, 4, 5 is regulated by controlled valves 13, 14, 15, 16, connected to a common air supply pipe 17, fed by a compressor 18. To the pipe 17 is further connected a pipe with controlled valve 19 for a purpose that will be described hereinafter. The oil pipes 6, 7, 8, 9 lead the oil to a storage tank 20. The valve members of the valves 13, 14, 15, 16, 19 are controlled by springs tending to open the valves.

The open and closed positions of the valves are regulated by disks 21, 22, 23, 24, 25, mounted on a common shaft 26, periodically rotated by a ratchet wheel 27 and journaled in the front wall 28 and the rear wall 29 of the frame of the apparatus. In front of the valves is mounted a framing 30, carrying five pivotally mounted pawls 31, 32, 33, 34, 35, kept in engagement with the corresponding distributing discs by spring action set up by the springs on the valves 13, 14, 15, 16 and 19. The discs 21, 22, 23, 24 each have a single recess, and the recesses of the disks have angular positions differing 90° from each other (Figs. 6–9). The disc 25 has four recesses, corresponding to those in the four discs, while the ratchet wheel 27 has eight recesses.

The air supply main 17 can be brought in communication by the valve 19 and a non-return valve 37 with the upper end of a cylinder 36. To the left of this cylinder is placed a cylinder 38, the lower end of which communicates with that of the other by means of a supply conduit 39 having a cock 40 and a non-return valve 41, and a discharge conduit 42 having a cock 43 and a non-return valve 44. The cylinders 36 and 38 are filled with thin machine oil or another suitable liquid. In the upper end of cylinder 38 is arranged a piston 45 having a piston rod 46. This rod, carrying a weight 47, is operatively connected to an arm 48 of a bell crank lever 49, the other arm of which forms a sector with teeth 50, meshing with corresponding teeth of a rack 51, the sector 49 and the toothed rack 51 being movably connected to the rear wall 29 of the frame. The rack 51 carries a pawl 52 engaging the ratchet-wheel 27. This wheel is also in engagement with a pawl 53, pivotally connected to the piston rod 46 and spring controlled, so that this pawl is always pressed into engagement with the ratchet-wheel 27.

Above the cylinder 36 there is provided an air exhaust valve 54 adapted to be opened by a lever 55, 56, that, when the rack 51 moves to the left, is turned about its pivot by an abutment 57 on the rack.

The air supply main is provided with a main valve 58 and a manometer 59.

As shown in Figures 1 and 2, the pipes 2, 3, 4 and 5 are in communication with the exhaust valve 54 by means of a pipe 54$^a$. Owing to this construction the compressed air within the containers 10 may be exhausted through the valve 54.

The operation of the device is as follows: It is assumed that all parts take the initial position, whereby the first well $a$ is ready to function. The main valve 58 is opened, so that the other valves 13, 14, 15, 16, 19, are brought under air pressure. The valves 13 and 19 at this time are open, as their pawls are in engagement with the recesses of the corresponding discs 21 and 25, so that the air under pressure enters into the right cylinder 36 and the well $a$. The air under pressure passing into the cylinder 10 forces the oil collected therein through the pipe 6 to the tank 20. Meanwhile the air under pressure forces the oil from the right cylinder 36 through the conduit 39, valve 40 and non-return valve 41 into the left cylinder 38 and the oil in cylinder 38 forces the piston 45 upwards, the rod 46 following this motion. The sector 49 is thereby caused to swing and the rack 51 moved to the left, whereby, when the piston has reached its top position, the valves 13 and 19 are closed and at the end of the stroke of the rack 51 the piece 57 turns the lever 55, 56 about its pivot, whereby the air exhaust valve 54 is opened to release the air from cylinder 36. The ratchet-wheel 27, as well as the distributing discs, has then made ⅛ revolution. The air pressure being released from the cylinder 36, the piston 45 will move downwards into the cylinder 38, which movement is furthered by the action of the weight 47. The piston will force the oil through the connection 42, valve 43 and non-return valve 44 from the cylinder 38 back into the cylinder 36. At the end of the downward piston movement the ratchet wheel 27 and thus the distributing discs are again rotated ⅛ revolution now by the pawl 53, while the lever 55, 56 and thereby the air exhaust valve 54 are freed at the beginning of the downward piston stroke. During the downward motion of the piston 45, whereby all valves are closed, the oil under natural pressure has the opportunity to pass through the opening 11 and the valve 12 into the cylinder 10 of the well $a$ in which cylinder 10 there is no pressure owing to the air of cylinder 10 having escaped through the air exhaust valve 54. In the oil pipes 6, 7, 8 and 10 non-return valves are arranged in order to prevent the oil from flowing back to the pits.

After a ¼ revolution of the ratchet wheel 47, the valve 14 and, for the second time, the valve 19 are opened, the former for attending the second well $b$ and the latter for the cylinder 36 and for moving the pawl device.

The operation above described is repeated for the well $b$ and subsequently for the wells $c$ and $d$ so that subsequently through the pipes 8 and 9 oil is forced to the tank 20. The above conditions apply to the case in which the four distributing discs 21, 22, 23, 24 differ 90° in angular position and consequently one entire revolution is required for a single functioning of each of the four wells $a$, $b$, $c$, $d$ the number of wells which may be connected to one distributing apparatus is theoretically unlimited. Preferably the coming into action of the wells is so regulated, that every time a well is sufficiently filled with oil, air under pressure is admitted and the oil forced to the collecting tank. This regulation can be effected by opening or closing more or less the valves 40 or 43 for the supply and discharge of oil to and from the cylinder 38.

By closing the valve 40 more or less, the duration of the air supply to the corresponding well is regulated, while by closing the valve 43 more or less, the downward movement of the piston 45 or the intervals between the air supply to the one and the following well are regulated. Further the capacity can be regulated by means of the tension of the air under pressure; when the tension in the main pipe increases the piston 45 will move upwards faster and the supply is then shorter; when the tension, however, decreases the piston will move slower and the supply last longer.

Having now particularly described my said invention, what I claim and desire to secure by Letters Patent is:

1. In a distributing and regulating apparatus for the supply of air under pressure to liquid containers, a liquid lifting device for each container with a supply conduit for air under pressure and a discharge conduit for liquid, air valves for the supply conduits, a regulating device proper having an air inlet valve means for each valve normally tending to open the valves, a distributing device for regulating the passage of air under pressure through the valves, the said device cooperating with the regulating device, actuating means operated by the latter device adapted to be moved in one direction under the influence of the air admitted to the regulating device, means operatively connecting said actuating means to the distributing device and adapted to bring the latter in a position in which all the valves are closed during the outward movement of the actuating means, an air exhaust valve for regulating device, an operative connection between the distributing device and the air exhaust valve of the regulating device so as to permit the escape of air at the end of the said outward stroke, and means operated by the actuating means for bringing the distributing device into a position in which the air inlet valve for the regulating device and at the same time another one of the first mentioned valves are opened by the forces normally tending to open them, during the backward movement of the actuating means.

2. A distributing and regulating apparatus as claimed in claim 1 in which the distributing device includes a shaft adapted to be rotated periodically in a single direction by means of the regulating device proper, and distributing disks mounted on said shaft.

3. A distributing and regulating apparatus as claimed in claim 1 in which the regulating device includes a liquid container in communication with the air supply and connected to a second liquid container by a discharge conduit and a return conduit.

4. A distributing and regulating apparatus as claimed in claim 1 in which the regulating device comprises a liquid container in communication with the air supply and connected to a second liquid container by a discharge conduit and a return conduit, the second liquid container being provided with a piston under the influence of a force normally intended to force it down.

5. An apparatus as claimed in claim 1 in which the regulating device includes a plurality of liquid containers, a discharge conduit and a return conduit placing said containers in communication, said actuating means including a piston arranged in one of said containers and under the influence of a force normally tending to force it down, a pawl and ratchet device for periodically rotating the distributing device, and means operatively connecting the piston to said pawl and ratchet device whereby when the piston is raised the distributing device will cause all of the valves of the air supply conduits and the air inlet valve of the regulating device to close.

6. An apparatus as claimed in claim 1 in which the regulating device includes a plurality of liquid containers, a discharge conduit and a return conduit placing said containers in communication, said actuating means including a piston arranged in one of said containers, and means controlled by said piston for opening the air exhaust valve of the regulating device to permit the air to escape from one of said containers and the piston to move downward.

7. An apparatus as claimed in claim 1 in which the regulating device includes a plurality of liquid containers, a discharge conduit and a return conduit connecting said containers for permitting liquid to travel in one container to the other and vice versa, said actuating means including a piston movably mounted in one of said containers, and a pawl operatively connected to said piston and functioning during the downward movement of the piston to cause the distributing device to move to such an extent that the inlet valve of the regulating device opens.

8. The combination with a series of liquid containers, discharge pipes communicating with said containers, air supply pipes communicating with said containers and adapted to convey compressed air to the containers for forcing liquid through the discharge pipes, an air controlled regulating device having an inlet valve and a discharge valve, valves controlling the passage of air through the air supply pipes, operating means for said valves, a piston rod actuated by said air controlled regulating device, a shaft, cam disks mounted on said shaft and engaging the valve operating means, a ratchet wheel mounted on said shaft, and pawls operatively associated with said piston rod for causing intermittent rotation of said ratchet wheel and shafts.

In testimony whereof I affix my signature.

JACOBUS ALEXANDER ROUMIMPER.